UNITED STATES PATENT OFFICE.

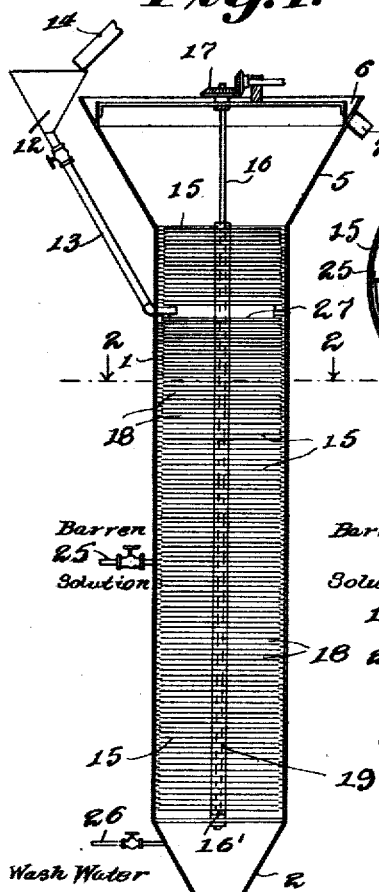
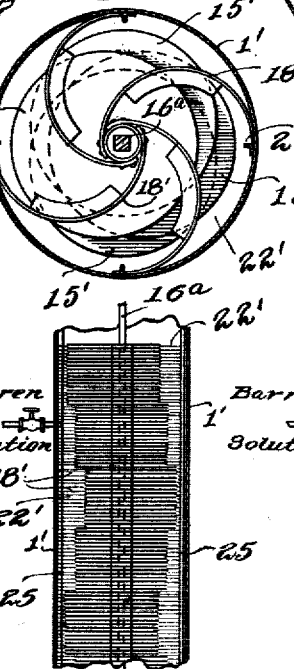
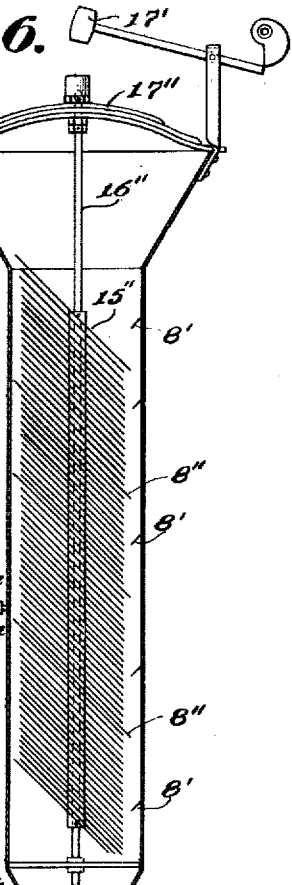
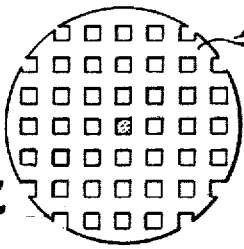

GEORGE MOORE, OF JOPLIN, MISSOURI.

REPLACING AND THICKENING APPARATUS.

1,231,409.  Specification of Letters Patent.  Patented June 26, 1917.

Application filed October 19, 1914. Serial No. 867,438.

*To all whom it may concern:*

Be it known that I, GEORGE MOORE, a citizen of the United States, residing at Joplin, in the county of Jasper and State of Missouri, have invented certain new and useful Improvements in Replacing and Thickening Apparatus; and I do hereby declare the following to be a full, clear, and exact description of the invention, such as will enable others skilled in the art to which it appertains to make and use the same.

This invention relates to improvements in replacing and thickening apparatus, and particularly to such as are especially adapted for use in the art of metallurgy.

An object in view is the provision of means for rapidly collecting and discharging the solids of pulp from fluid thereof.

A further object is the provision of means for taking advantage of the fact that solids of slime pulp when settled on a supporting surface and then dislodged travel in coagulated masses downward by gravity at a greatly augmented speed over that of the settling rate of the separate particles in suspension.

A further object is to hasten coagulation of uncoagulated solids of pulp and precipitation of coagulated masses of settled solids in a body of fluid which is obtained by providing in such body a zone of travel and a substantially quiet zone communicating with the zone of travel.

A further object is to provide settler surfaces so disposed in a container as to leave an avenue of descent for settled coagulated masses of solids in such relation to the surfaces that the thinning of liquid between surfaces incident to settling of solids will allow diffusion of suspended solids in the liquid in the avenue, causing such solids in part to find their way between the surfaces and thus leave the liquid in the avenue a freer path for descending coagulated solid masses which masses accordingly descend more rapidly than they could if greater quantities of matter in suspension were present in the avenue.

A more detailed object is the provision of means for taking further advantage of this fact by providing for a sufficient amount of travel of the coagulated solids for insuring a replacement of the liquid carried in each coagulated mass by liquid through which the mass is passing.

With these and further objects in view as will in part hereinafter become apparent and in part be expressed, the invention comprises certain novel constructions, combinations and arrangements of parts as will be hereinafter specified and claimed.

In the accompanying drawing,—

Figure 1 is a diagrammatic showing of a structure embodying the features of the present invention.

Fig. 2 is an enlarged transverse section taken on the plane indicated by line 2—2 of Figs. 1 and 2.

Fig. 3 is an enlarged detail fragmentary vertical section, parts being seen in elevation.

Figs. 4 and 5 are respectively an enlarged sectional plan and a sectional elevation of a modified embodiment.

Fig. 6 is a view similar to Fig. 1 of a further embodiment.

Fig. 7 is a plan view of a modified plate detached.

Referring to the drawing by numerals, 1 indicates a container or tank terminating at its lower end in the hopper discharge bottom 2 discharging through a pipe 3 controlled by a valve 4. To the upper end of the tank is fixed a hopper 5 provided with an internally-arranged decanting trough 6 about its upper end for the discharge of solutions through an outlet 7. A pipe 13 provided with a hopper 12, leads into container 1 at an intermediate point in the length of the container, and a supply launder or pipe 14 delivers to hopper 12 pulp to be treated at approximately the rate of treatment in tank 1, the supply being controlled by apparatus and from a source not shown.

Arranged within the tank 1 are superimposed plates 15 which are arranged as near together as practicable, for the purpose of treatment of pulp as hereinafter specified, the distance in actual practice being of course variable within a reasonable range, but should be approximately a half of an inch. This distance of vertical spacing of the superimposed plates 15 will be substantially identical regardless of the actual diameter of the plates, since it is desirable, and one of the objects attained by this invention, to so divide pulp as to increase the rate of precipitation both by affording a very short distance for a settling solid to travel to a supporting surface and by preventing interference with such settling through the presence of quantities of partially settled solids through which the particular particle would have to pass in reaching a resting place.

Each of the plates 15 is preferably of very thin sheet metal, but the substance of the several plates is immaterial, so far as their functions are concerned. A preferably axially-arranged shaft 16 extends substantially throughout the tank, and is appropriately journaled at its end portions, the shaft being geared, as at 17, to a source of power not illustrated, for being rotated at a slow rate. The shaft 16 is squared or otherwise formed so that said plates 15 which have square openings through which the shaft extends, will revolve with the shaft. Between each two of the plates 15 is arranged a scraper 18, each of which consists of a series of volute arms, which arms are fixed at their inner ends to a ring 19 loosely surrounding shaft 16. A scraper 18 also rests on the uppermost plate 15. The outer end of each scraper arm 18 rests in the respective corner or tank 1. As the shaft 16 revolves the several plates 15, the scraper arms 18, remaining stationary, act to scrape settled and coagulated solids collected on the several plates 15 to the peripheries thereof and to discharge the solids in clots or drops down the avenue 22 formed between the peripheries of plates 15 and the walls of the container 1 and surrounding the plates, it being understood, of course, that in operation the entire container is filled with liquid through which the coagulated masses of solids descend by gravity, the rate of descent being much more rapid than the descent of uncoagulated solids of pulp suspended in the liquid. Obstructions as rods 8, which are threaded or otherwise removably inserted through the corner portions of the walls of tank 1, are arranged at different parts of avenue 22 which interfere with and deflect the falling clots, causing them to change their forms and size and to present new surfaces to the replacing solutions.

To avoid excessive friction between the several plates and scrapers, particularly in the lower portions of the tank due to the weight of superimposed plates and scrapers, the scrapers are preferably rendered buoyant, as by being formed at least in part of buoyant material and the displacement of each is approximately sufficient to float itself and the plate 15 immediately above, so that very little accumulated weight is sustained by the lower plates. The lower end of shaft 16 is provided with a sleeve 16' detachably fixed to the shaft and adapted to sustain the lowermost plate 15 and whatever weight from upper plates and scrapers may be in excess of the buoyancy of the scrapers. The engagement of sleeve 16' also enables lifting all of the scrapers and plates with shaft 16 bodily out of container 1 after rods 8 have been withdrawn. It is, of course, immaterial whether plates 15 or arms 18 are moved, so long as there is relative movement between the two.

In practice I find that if the avenue 22 is left as a substantially free unobstructed passageway, relatively large clots or masses of solids discharged from the upper plates 15 descend without material change in form, and therefore, carry with them quantities of solutions from upper portions of the container to lower portions thereof with a resulting diffusion of those solutions of greater dissolved contents in the solutions of less dissolved contents. To avoid this difficulty, deflecting means are provided which sufficiently break up the masses in the course of their descent to allow replacement of their contained fluid by the fresh fluids into which they are falling. At the same time, this deflecting is done with as little agitation as possible so as to prevent the solids from going back into suspension. Obviously various forms of deflecting means may be employed, one of the simplest consisting of the rods 8. Other forms are seen in Figs. 4, 6 and 7, as will be hereinafter pointed out.

When pulp is being supplied to tank 1 which contains some sand, there would be liable to be set up certain counter currents as a result of direct descent of the sand along that part of the avenue 22 into which the pipe 13 discharges. To avoid this, I extend the discharge end of pipe 13 a considerable distance into the container 1 and deliver the discharge from the pipe onto a plate 27 which distributes the sand approximately evenly about the evenue 22 so that approximately the same quantity of sand will be descending at different points at once, and therefore, will not effect any overbalancing along one line with respect to other parts of the avenue 22.

In operation tank 1 is filled with pulp to be treated either for replacement of values or for thickening the pulp, or the pulp may be treated for both purposes in the apparatus disclosed, or the container 1 may be filled with a cyanid solution or other appropriate liquid and dry ore supplied to hopper 5 so as to form a pulp to be treated. When used for replacement purposes barren solution is supplied through a pipe 25 to container 1 at an intermediate point in its length and water or washing fluid is supplied through a pipe 26 preferably at the lower end of container 1. Assuming the material to be treated to be pulp supplied through supply pipe 14, the pulp entering container 1 spreads throughout portions of the container, and the solids begin at once to precipitate onto the several plates 15. The liquid of the pulp rises to the decanting trough 6, clarifying as it rises since the solids have had opportunity to settle on the several plates 15. As they settle they are scraped off to descend down the avenue 22 to the discharge pipe 3. The rate of movement of the plates 15 is so slow as not to cause arms 18 to appreciably agitate the contained pulp, and therefore, does not interfere with the settling rate of solids. As the masses of coagulated solids discharged off of the peripheries of the plates 15 are descending down the avenue 22, the cyanid solution from pipe 25 slowly ascends for preventing the liquid of the pulp from descending with the solids, and the water from pipe 26 slowly ascends for preventing excessive descent of the cyanid solution so as to prevent diffusion of the valuable liquid down into the practically valueless water, so that the fluid discharged with the solids through pipe 3 will be of minimum dissolved contents. It is to be observed that the area across the path of travel in the avenue 22 is sufficiently small relative to the bulk of mass being treated to prevent the valuable liquid entering with the pulp from becoming excessively diffused down past the pipe 25 and for preventing the cyanid from becoming diffused in the contained fluid down past the pipe 26.

Plates 15 serve essentially as means for maintaining substantially quiet zones in which there are no currents preventing settling of suspended uncoagulated solids into coagulated masses. The effect of this is important in the present invention. It is obvious that if a counter current of fluid is maintained past suspended uncoagulated solids at the rate of settling of such solids in still liquid, the solids will have relative travel only and will actually remain stationary, so that to enable actual travel of the solids the rate of travel of the fluid must be reduced, and the actual travel of the solids will of course increase with the proportional decrease in speed of the counter current. Ordinarily an equal rate of travel of the two elements would be maintained by keeping the counter current flow at one half the rate of settling of uncoagulated suspended solids in still fluid. Since the rate of precipitation of masses of coagulated solids is many times faster than that of uncoagulated solids, the counter current in the practising of the present invention can be maintained many times faster than that of a counter current through which uncoagulated suspended solids are settling, whereby greatly increased capacity in a container of a given size is afforded by the present invention.

Plates 15 in revolving carry with them certain portions of the surrounding solutions and thus produce horizontal circulatory motion therein which tends to prevent and break up undesirable circulatory movement in directions other than horizontal, whereby the rise of solutions of the column is caused to be continuous and uniform.

It will be observed from the foregoing that one of the effective features of the structure disclosed consists in the provision of the relatively confined avenue which prevents diffusion and yet permits the counter movements of solids and fluids. It should, of course, be apparent that while the plates 15 have been shown as disks, both the container and disks may be otherwise shaped and the zone of travel may also be modified as to shape so long as its relative proportions are substantially maintained. As indicating one form of such variation, the structure seen in Figs. 4 and 5 will be noted to consist of a container 1' supplied with plates 15'. The usual shaft 16ª and scrapers 18' are employed in this structure for discharging settled, coagulated solids down through the avenue 22'. The free ends of scrapers 18' in this embodiment engage vertically arranged angle bars 25 to hold the scrapers against rotation. The arrangement of plates 15' provides the means for deflecting precipitating masses of coagulated solids. To this end, plates 15' are mounted eccentrically on shaft 16ª, and are arranged in groups with the excess of the plates of one group at one side of shaft 16ª advanced angularly from that of the next higher group and so on down until the principal portion of the resulting avenue or zone of travel surrounding the plates 15' is generally shaped as a spiral.

It will be observed that the deposits on the several plates 15 are removed mechanically and not dislodged by gravity, the reason for which does not lie principally in the fact that the plates are preferably disposed substantially horizontally, but more especially because the proximity of the superimposed plates is such that regardless of any angle at which the plates might be set for causing dislodgment by gravity, so long as the angle of inclination is sufficiently within the angle of repose to cause any solids to settle and remain on the plates and to coagulate there, such angle of inclination could not be great enough to effect gravity dislodgment constantly and to prevent clogging and packing of solids between the plates. To demonstrate this phase of the invention, a modified embodiment is seen in Fig. 6 wherein the plates 15" are carried by the shaft 16" and the shaft is suspended on a spring 17" and is adapted to be struck periodically by a hammer 17' actuated by a cam or other appropriate mechanism so that when proper opportunity has been afforded for collection of solids on plates 15", a tremor is imparted to the several plates 15" by the vibration of shaft 16" when struck by the hammer 17'. This vibratory movement of the plates 15" dislodges, that is, detaches the coagulated masses thereon and leaves them free for gravitating toward the outlet at the lower end of the container. The inclination of plates 15″, may of course, be varied according to the consistency of the pulp being treated.

Plates 15″ instead of being circular, correspond to the cross section of the tank. Baffles 8′ are disposed to deflect precipitating masses of coagulated solids, and extensions 8″ on some of plates 15″ coöperate to this end.

The avenue or zone of travel is susceptible of assuming various forms as, for instance, such as suggested in Fig. 7 wherein plate 15$^a$ is reticulated and the gage of the mesh may be varied to any desirable extent. The apertures in plate 15$^a$ form a many-times divided zone or avenue of travel, the spaces above the bars or strips of plate 15$^a$ produce quiet zones in that they afford places of non-activity sufficient to enable settling and coagulation of solids on said bars or strips. Plates 15$^a$ may be employed instead of plates 15, 15′ or 15″. Of course, there would be no necessity for an avenue of travel about the edges of plate 15$^a$ and when this form of plate is used its edges may be disposed contiguous to the walls of the container.

It will be observed that in each embodiment are found superimposed zones of comparative quiet, that is, quiet compared with the upwardly moving column, so as to permit settling of solids, said zones of quiet being arranged in a column disposed along and extending substantially throughout the length of the moving column, the hoppers at the upper and lower ends of the tank not being considered. It is immaterial whether the moving column is substantially a single rising body as in Fig. 1 or formed of separate portions as in Fig. 7, and it is also immaterial whether the rising column is straight or tortuous.

While the structures disclosed are particularly well adapted for use in the metallurgical art, they are, at the same time, obviously susceptible of advantageous employment in any of the industrial arts where it is desirable either to replace moisture in solids or to thicken matter in suspension or both.

What I claim is:

1. In an apparatus for treating slimes, the combination with a container, of superimposed disks of substantially uniform size arranged therein to form a column disposed in such relation to the container as to provide a passageway for the descent of settled solids, and means for moving solids settled on the disks into said passageway, the disks being arranged in clusters and the disks of one cluster being disposed with their axes out of the line of the axes of the disks of the other clusters.

2. In an apparatus for treating slimes, the combination, with a container, of superimposed disks arranged substantially horizontally therein to form a column disposed in such relation to the container and having the disks disposed in such relation to each other as to provide a tortuous passageway for the descent of settled solids, and means for moving solids settled on the disks into said passageway.

3. In an apparatus for treating slimes, the combination with a container, of superimposed disks arranged therein to form a column disposed in such relation to the container and having the disks disposed in such relation to each other as to provide a tortuous passageway for the descent of settled solids, scrapers for moving solids collected on the disks into the said passageway, and means for effecting relative movement of the disks and scrapers for causing such movement of solids.

4. An apparatus for treating slimes comprising a container having an avenue for gravity effected travel of settled solids, juxtaposed, superimposed plates in the container positioned to enable deposits of settled solids to lodge on the surfaces of said plates and to remain thereon against gravity dislodgment, means for dislodging the solids from the surfaces to enable gravity effected travel of the dislodged solids along the avenue, and deflecting means within the avenue in the path of descent of dislodged solids.

5. In an apparatus for treating slimes, the combination, with a container, of superimposed spaced plates disposed for affording supports for settled solids of pulp and providing a column of zones of relative quiet for enabling solids to settle on said plates, a zone or avenue of travel for uprising solutions being formed along the column of zones of quiet, and the column of zones of quiet extending substantially throughout the length of the zone of travel, and deflecting means in the zone or avenue of travel for breaking up coagulated masses of solids.

In testimony whereof I affix my signature in presence of two witnesses.

GEORGE MOORE.

Witnesses:
R. M. PARKER,
EDGAR M. KITCHIN.